(No Model.)
J. LEHR & J. BODANI.
PRESSURE REGULATOR.
No. 486,485. Patented Nov. 22, 1892.
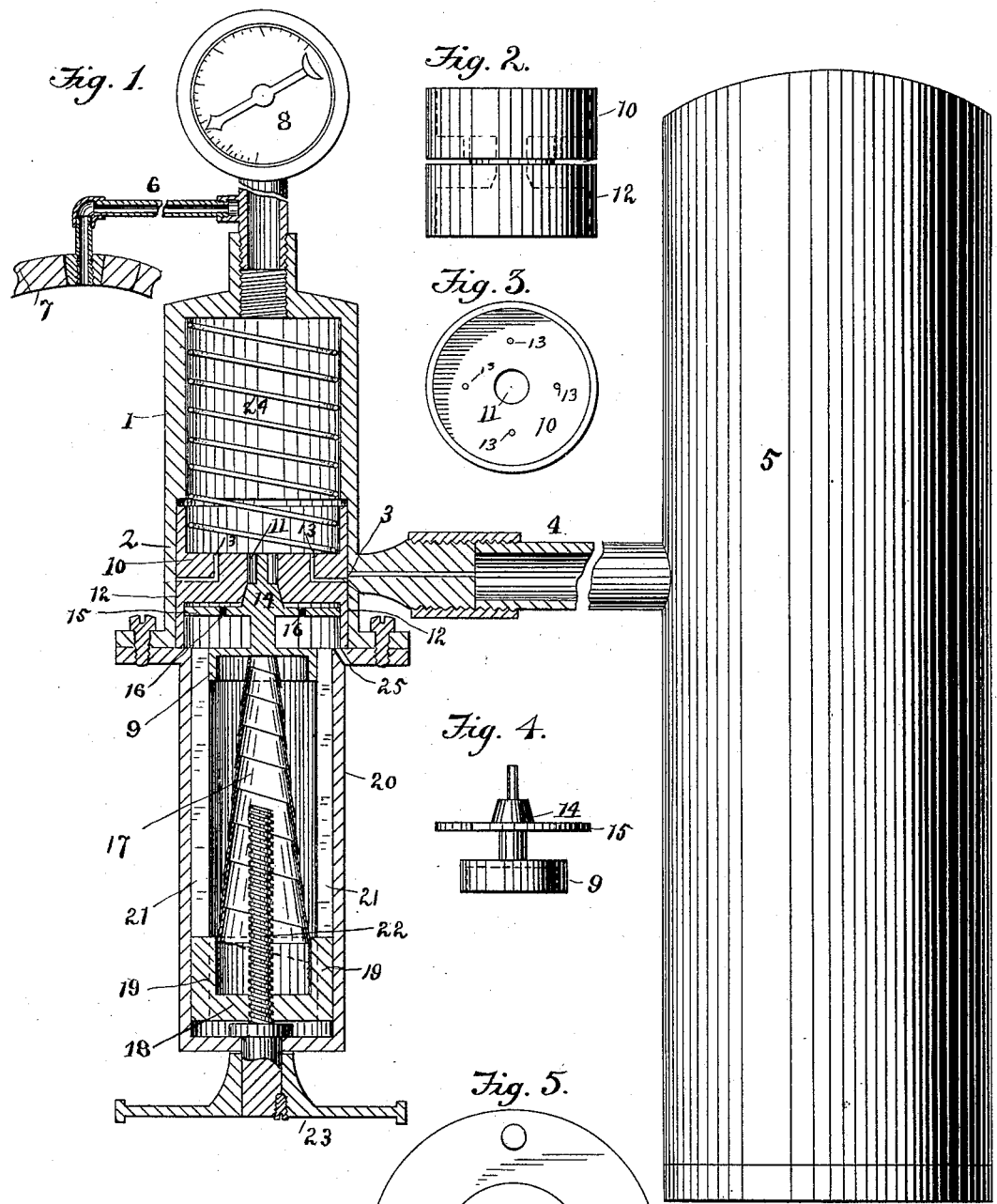
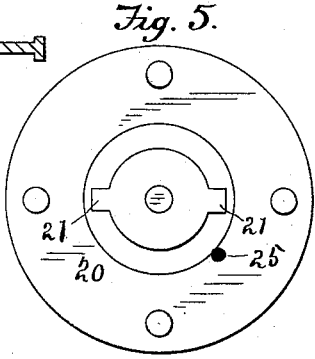
WITNESSES:
Thomas Durant.
Alex F. Stewart.
INVENTORS.
Joseph Lehr
Joseph Bodani
BY Church & Church
their ATTORNEYS

UNITED STATES PATENT OFFICE.

JOSEPH LEHR AND JOSEPH BODANI, OF ROCHESTER, NEW YORK.

PRESSURE-REGULATOR.

SPECIFICATION forming part of Letters Patent No. 486,485, dated November 22, 1892.

Application filed August 12, 1892. Serial No. 442,913. (No model.)

*To all whom it may concern:*

Be it known that we, JOSEPH LEHR and JOSEPH BODANI, of Rochester, in the county of Monroe and State of New York, have invented certain new and useful Improvements in Pressure-Regulators; and we do hereby declare the following to be a full, clear, and exact description of the same, reference being had to the accompanying drawings, and to the reference-numerals thereon.

Our present invention has for its objects to provide a device adapted to maintain an even pressure of air, gas, or other fluid in a chamber or receptacle supplied from a suitable source, which pressure is capable of easy regulation, and though it is especially adapted for maintaining an even and regular pressure on the beer in a keg from which it is being drawn said device is obviously capable of use in other connections and for other purposes; and to these ends it consists in certain improvements in construction and combinations of parts, all as will be hereinafter fully described, and the novel features pointed out particularly in the claims at the end of this specification.

In the accompanying drawings, Figure 1 is a vertical sectional view of our regulator, showing its application to a beer-forcing apparatus; Figs. 2 and 3, side and plan views, respectively, of the movable piston; Fig. 4, a side view of the relief-valve removed; Fig. 5, a plan view of the lower portion of the casing.

Similar reference-numerals in the several figures denote similar parts.

In the present embodiment of our invention we provide a casing 1, having a chamber and a lower cylindrical part 2, into which leads a port or passage 3, adapted to be connected by a pipe 4 with a reservoir 5, supplied by a suitable pump with air or gas under pressure preferably greater than that desired on the beer.

From the upper end of chamber 1 a pipe 6 leads to a beer-keg 7 or other place where it is desired to have an even and easily-regulated pressure of air. A pressure-gage 8 is also connected to the upper portion of chamber 1 to indicate the pressure therein and on the beer as well, and while it could be located elsewhere we prefer to arrange it in proximity to the regulator, so that the latter can be easily set for the desired pressure. Arranged in the lower cylindrical portion 2 of the chamber is a sliding piston 10, having recessed upper and lower sides, a central aperture 11, and a lower packing-head 12, the space between the heads 10 and 12 constituting a groove, as at present constructed, communicating by a series of apertures 13 with the chamber above the piston, and fitting in the central aperture or passage 11 is a relief-valve 14, having a tapering portion fitting a seat in said aperture, a disk-like portion or guiding-flange 15, operating in the under recessed part of the lower piston-head and having one or more apertures 16 therein, and beneath the disk 15 is a disk 9, recessed slightly to receive the upper end of a spring 17 and guided in the lower part of the casing.

The lower part 20 of the casing is constructed, preferably, of cylindrical form, with a flange at its upper end facilitating its connection to the part 1, and in it is arranged to slide a nut 18, having projections 19, engaging grooves 21 at the sides and preventing rotation. An adjusting-screw 22 extends through the casing and enters the threaded aperture in the nut, said screw being prevented from downward movement by a collar thereon and from upward movement by the boss on the handle 23, secured to the lower end. The lower end of the spring 17 rests upon the nut 18, and its tension is adjusted by rotating the handle 23, moving the nut up or down. A light spiral spring 24 is arranged between the top of the chamber 1 and the piston 10 for the purpose of insuring the descent of the latter and holding it, with the groove, out of line with and below the port or passage leading to the air-supply when the spring 17 is not under tension, this being the normal position of the device when no pressure is desired in the keg or other place. This spring is not essential, but we prefer to employ it that the downward movement will be insured and the piston will not stick.

With the piston in the position shown in Fig. 1, if it is desired to have a pressure of, say, ten pounds on the beer, the operator turns the handle 23, moving the nut upward and compressing the spring 17 slightly, this being sufficient to raise the piston until the groove comes in line with the port 3, when the air will be admitted from the reservoir to the chamber 1, passing through the apertures 13 and thence to the keg. If a heavy pressure of air is in the reservoir, the immediate tendency of the piston is to move down and cut off communication with the reservoir and also to force open the relief-valve 14 (though this is of small area) against the tension of its spring, allowing escape through the openings 16 and an aperture 25 in the casing 20, leading to the open air. The handle 23 is now adjusted until the gage indicates the required pressure (ten pounds) in the chamber and on the beer, and this will remain constant, because if reduced by drawing off the beer, leakage, or otherwise the spring will move the piston upward and admit air from the reservoir until the required pressure is secured—that is, until the pressure in the chamber and on top of the piston is slightly greater than that exerted by the spring—and if the pressure is too great the piston is moved down, the valve 14 opened, and the excess allowed to escape, the equilibrium being maintained at all times, though the pressure can be changed at any time by moving the handle and changing the tension of the spring 17.

In practical operation it is intended that the regulator and the connected pressure-gage should be located near the bar where the beer is served, so that the bar-keeper can readily regulate the pressure on it as desired.

It will be understood that the flow of gas or any fluid or liquid under pressure can be regulated by our apparatus, and the surplus forced out through the exhaust passage or aperture 25 when the pressure is too high could be conducted away and utilized; but as it is especially adapted for air-pressure this provision is unnecessary.

The parts of the device can readily be removed for cleaning or repair by taking off the lower section 20 of the casing, as will be understood.

Numerous modifications of the construction herein shown could be made without departing from the spirit of our invention, and we do not therefore desire to be confined to precisely the details shown.

We claim as our invention—

1. In a pressure-regulator, the combination, with the casing embodying the chamber and having a fluid-inlet port, of the movable piston operating in said chamber and co-operating with the port and governing the supply of fluid to one side of the piston, a relief-valve in the piston, and a spring for operating it and the piston in a direction to open communication between the top of the piston and the inlet-port, substantially as described.

2. In a pressure-regulator, the combination, with the casing embodying the chamber and having a fluid-inlet port, of the movable piston operating in said chamber, co-operating with said port and regulating the supply of fluid to one side of the piston, a relief-valve in the piston opening from the pressure side thereof, a spring operating to close said valve and move the piston in a direction to open communication with the supply-port, and means for adjusting said spring, substantially as described.

3. In a pressure-regulator, the combination, with the casing embodying the chamber and having a fluid-inlet port, of the movable piston operating therein, co-operating with the port and having the recessed under side, the relief-valve operating in the piston, having the perforated guiding-flange, and the adjustable spring operating on the valve to close it and move the piston to open the inlet-port, substantially as described.

4. The combination, with the cylinder having the inlet-port, the piston operating in the cylinder and co-operating with the port, and the spring for operating the piston in one direction, of the relief-valve in the piston and the spring for closing it and moving the piston in the opposite direction, substantially as described.

5. The combination, with the cylinder having the inlet-port, the piston operating in the cylinder having the groove, and one or more passages leading to one side of the piston, of the relief-valve opening toward the other side of the piston, the spring closing said valve and moving the piston, and means for regulating the pressure of the spring, substantially as described.

6. The combination, with the cylinder having the inlet-port, the piston operating in the cylinder having the groove, and one or more passages leading to one side of the piston and the central aperture, of the relief-valve operating in said aperture and guided on the piston and the adjustable spring in the casing, operating to close the valve and move the piston, substantially as described.

7. The combination, with the cylinder having the inlet-port, the piston operating in the cylinder, of the relief-valve in the piston, the movable nut guided in the casing, and the screw for operating it, substantially as described.

8. The combination, with the casing, the cylinder having the inlet-port, the piston operating in the cylinder, of the relief-valve in the piston, having the extension guided in the casing, the adjustable nut guided in the casing, and the spring interposed between the nut and valve, substantially as described.

9. The combination, with the cylinder having an inlet-port, a piston operating in the cylinder and co-operating with the port, and the relief-valve in the piston, of the casing-section 20, removably connected to the cylinder, the adjustable nut therein, and the spring interposed between the nut and valve, substantially as described.

JOSEPH LEHR.
JOSEPH BODANI.

Witnesses:
FRED F. CHURCH,
GEORGE C. RODA.